(12) United States Patent
Oga

(10) Patent No.: US 12,143,549 B2
(45) Date of Patent: Nov. 12, 2024

(54) TRANSMISSION SYSTEM

(71) Applicant: CANON KABUSHIKI KAISHA, Tokyo (JP)

(72) Inventor: Satohiro Oga, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/456,252

(22) Filed: Aug. 25, 2023

(65) Prior Publication Data

US 2024/0073344 A1     Feb. 29, 2024

(30) Foreign Application Priority Data

Aug. 26, 2022   (JP) .................................. 2022-134630

(51) Int. Cl.
| | |
|---|---|
| H04N 1/00 | (2006.01) |
| G06F 3/12 | (2006.01) |
| G06K 15/02 | (2006.01) |
| H04N 1/32 | (2006.01) |

(52) U.S. Cl.
CPC ..... *H04N 1/32149* (2013.01); *H04N 1/00334* (2013.01); *H04N 1/00347* (2013.01); *H04N 1/32106* (2013.01); *H04N 2201/3269* (2013.01)

(58) Field of Classification Search
None
See application file for complete search history.

(56) References Cited

U.S. PATENT DOCUMENTS

| | | | | |
|---|---|---|---|---|
| 8,322,618 | B2 * | 12/2012 | Kashiwagi | H04N 1/33307 235/487 |
| 2001/0044324 | A1 * | 11/2001 | Carayiannis | H04M 1/2755 455/566 |
| 2004/0218226 | A1 * | 11/2004 | Antognini | H04N 1/00209 358/1.15 |
| 2005/0258246 | A1 * | 11/2005 | Wolff | G06F 16/93 235/470 |
| 2006/0053137 | A1 * | 3/2006 | Tanimoto | G06F 16/381 707/E17.096 |

(Continued)

FOREIGN PATENT DOCUMENTS

| | | | | |
|---|---|---|---|---|
| JP | H0522478 | * | 1/1993 | ............... H04N 1/00 |
| JP | H11331445 | A | 11/1999 | |

(Continued)

*Primary Examiner* — Beniyam Menberu
(74) *Attorney, Agent, or Firm* — Canon U.S.A., Inc. IP Division

(57) ABSTRACT

A transmission system includes a first fax apparatus, and a second fax apparatus, wherein the first fax apparatus includes a transmission unit that performs fax communication, and an acquisition unit that acquires information by decoding code information included in image data, wherein the transmission unit transmits the image data and the acquired information via the fax communication, and wherein the second fax apparatus includes a reception unit that performs the fax communication, a generation unit that generates code information by encoding the information received by the reception unit via the fax communication, an addition unit that adds the generated code information to the image data received by the reception unit, and a printing unit that prints an image on a sheet based on image data obtained by adding the generated code information to the received image data.

6 Claims, 11 Drawing Sheets

(56) References Cited

U.S. PATENT DOCUMENTS

| | | | | |
|---|---|---|---|---|
| 2009/0039146 A1* | 2/2009 | Seo | ................. | G06F 40/166 |
| | | | | 235/375 |
| 2009/0161158 A1* | 6/2009 | Fujikawa | ........... | H04N 1/00209 |
| | | | | 358/1.15 |
| 2013/0191163 A1* | 7/2013 | Lorsch | .................. | G06Q 10/10 |
| | | | | 705/3 |
| 2017/0048404 A1* | 2/2017 | Miura | .................. | G06F 3/1292 |
| 2020/0267284 A1* | 8/2020 | Tong | .................. | G06V 30/413 |

FOREIGN PATENT DOCUMENTS

| | | | | | |
|---|---|---|---|---|---|
| JP | | 2000261588 | * | 9/2000 | ............... H04N 1/00 |
| JP | | 2008182405 | * | 8/2008 | ............... H04N 1/00 |
| JP | | 2008259081 | * | 10/2008 | ............... H04N 1/00 |
| JP | | 2009272982 | * | 11/2009 | ............... H04N 1/00 |
| JP | | 2017118379 | * | 6/2017 | ............... H04N 1/00 |

\* cited by examiner

FIG.9
901
IN CASE WHERE PRINTING POSITION IS DESIGNATED
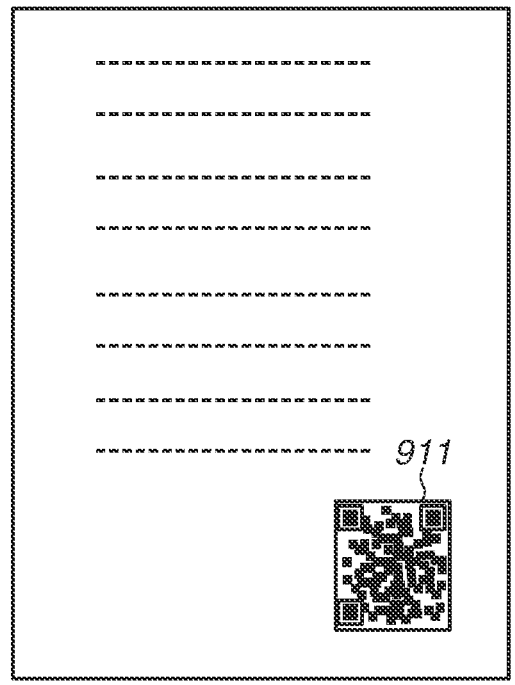
902
IN CASE WHERE PRINTING POSITION IS NOT DESIGNATED
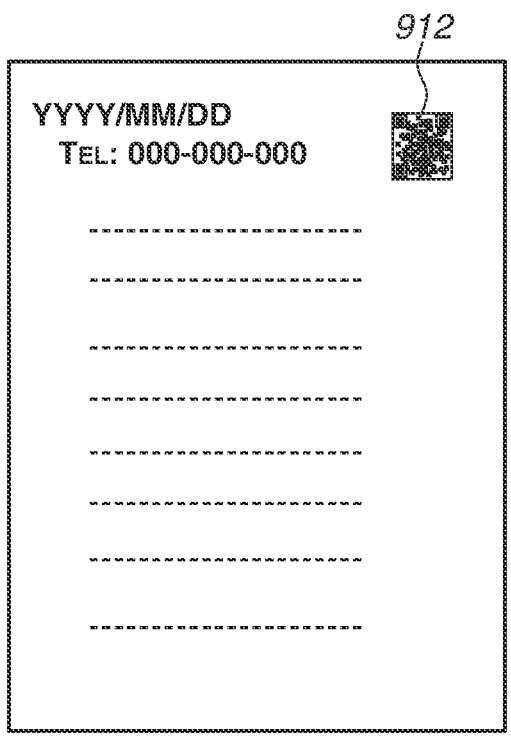

FIG.10A
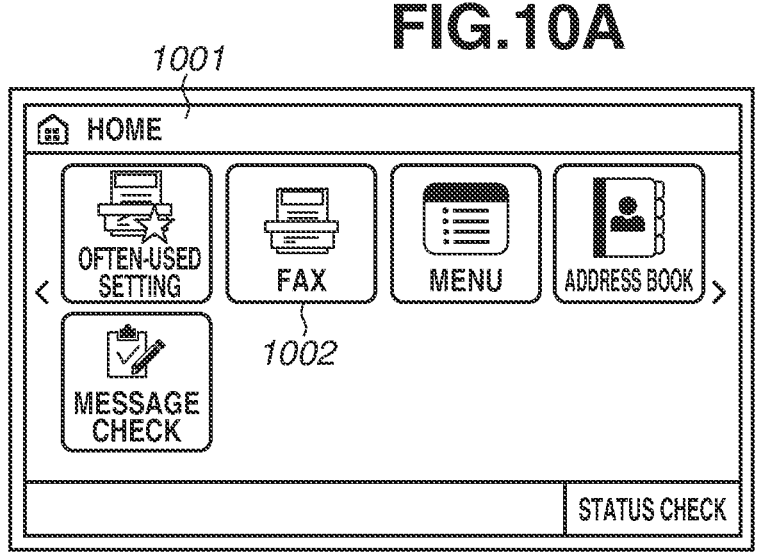
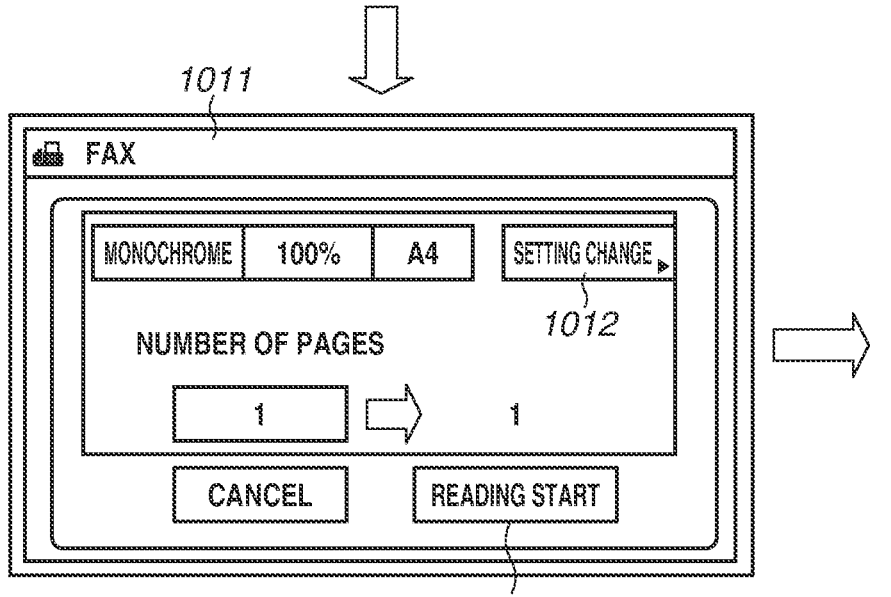
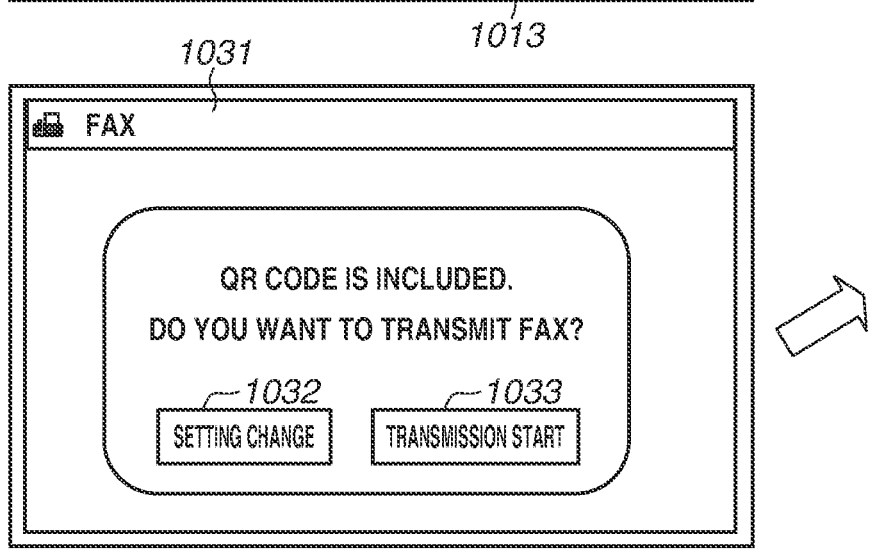
FIG.10B

TRANSMISSION SYSTEM

BACKGROUND

Field

The present disclosure relates to a transmission system.

Description of the Related Art

Japanese Patent Application No. H10-127416 discusses that, when image data generated by scanning a document including a quick response (QR) Code® is faxed, the image data is transmitted by decoding and replacing the QR Code® included in the image data with reconstructed image data.

In the technique discussed in Japanese Patent Application No. H10-127416, the image data on the QR Code® is faxed. For this reason, depending on a transmission resolution, a part of the QR Code® can be incomplete and a user receiving the faxed image data may not be able to decode the QR Code®.

SUMMARY

Aspects of the present disclosure are directed to a technique for enabling output of a QR Code® that is decodable by an apparatus that has received a faxed image data in a case where image data including a QR Code® is faxed.

A transmission system includes a first fax apparatus, and a second fax apparatus, wherein the first fax apparatus includes a transmission unit configured to perform fax communication, and an acquisition unit configured to acquire information by decoding code information included in image data, wherein the transmission unit transmits the image data and the information acquired by the acquisition unit through the fax communication, and wherein the second fax apparatus includes a reception unit configured to perform the fax communication, a generation unit configured to generate code information by encoding the information received by the reception unit through the fax communication, an addition unit configured to add the code information generated by the generation unit to the image data received by the reception unit, and a printing unit configured to print an image on a sheet based on image data obtained by adding, by the addition unit, the code information to the image data received by the reception unit.

Further features of the present disclosure will become apparent from the following description of exemplary embodiments with reference to the attached drawings.

BRIEF DESCRIPTION OF THE DRAWINGS

FIG. 9 is a diagram illustrating examples of a printing position of a QR Code® printed when the other image forming apparatus receives image data including QR Code® information.

DESCRIPTION OF THE EMBODIMENTS

A preferred exemplary embodiment of the present disclosure will be described in detail with reference to drawings. The exemplary embodiment is not seen to be limiting, and any combination(s) of features described in the exemplary embodiment are not necessarily essential for implementing aspects of the disclosure.

Figure 1:
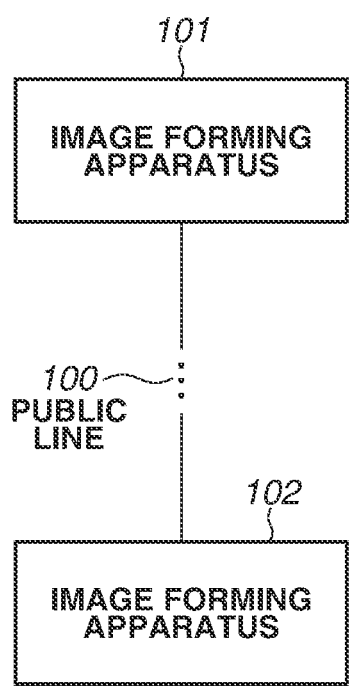
FIG. 1 is a block diagram illustrating a network configuration.

FIG. 1 is a block diagram illustrating a network configuration according to the present exemplary embodiment. In the present exemplary embodiment, image forming apparatuses 101 and 102 serve as fax apparatuses, are both connected to a public line 100, and can communicate with each other.

Image data generated by scanning a document by the image forming apparatus 101 can be transmitted to the image forming apparatus 102 via fax communication. Image data generated by scanning a document by the image forming apparatus 102 can be transmitted to the image forming apparatus 101 via fax communication.

Figure 2:
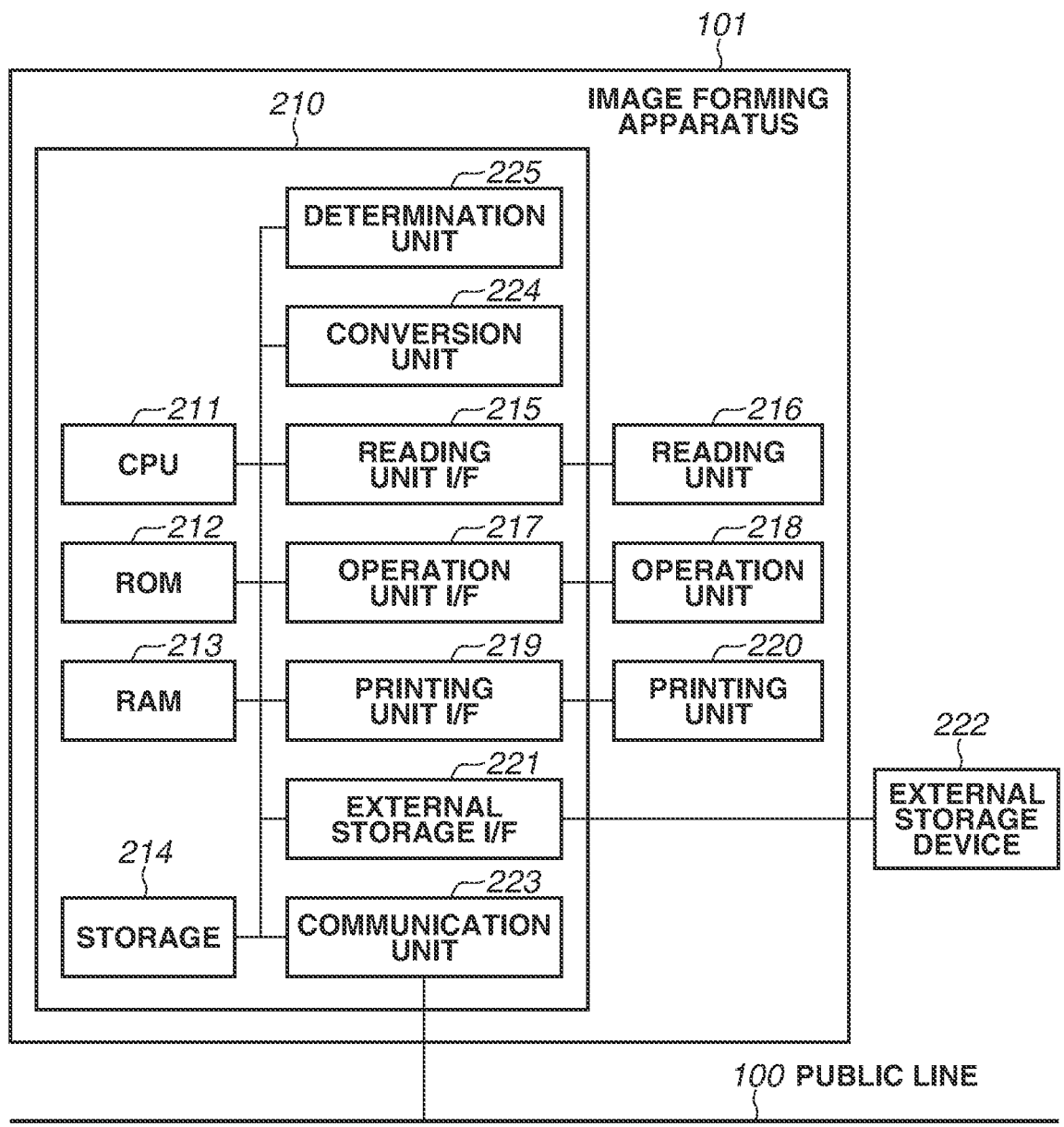
FIG. 2 is a block diagram illustrating a configuration of an image forming apparatus.

FIG. 2 is a block diagram illustrating a configuration of the image forming apparatus 101. A control unit 210 including a central processing unit (CPU) 211 controls the image forming apparatus 101. The CPU 211 reads out control programs stored in a read only memory (ROM) 212 or a storage 214, to perform various kinds of control such as reading control, printing control, and transmission control. The ROM 212 stores the control programs executable by the CPU 211. The ROM 212 also stores a boot program, font data, and the like. A random access memory (RAM) 213 is a main storage memory for the CPU 211, and is used as a work area and a temporary storage area for developing the various kinds of control programs stored in the ROM 212 and the storage 214. The storage 214 stores image data, print data, an address book, various kinds of programs, and various kinds of setting information. A flash memory is assumed as the storage 214. Alternatively, an auxiliary storage device such as a solid state drive (SSD), a hard disk drive (HDD), or an embedded multimedia card (eMMC) can be used as the storage 214.

In the image forming apparatus 101, one CPU 211 performs the processing in the below-described flowcharts using one memory (RAM 213), but this implementation is not limiting. For example, a plurality of CPUs, RAMs, ROMs, and storages can cooperate with one another to perform the processing in the below-described flowcharts. A part of the processing can be performed by a hardware circuit such as application specific integrated circuits (ASIC) and a field programmable gate array (FPGA).

An operation unit interface (I/F) 217 connects an operation unit 218 and the control unit 210. The operation unit 218 displays information to a user and detects an input from the user.

A reading unit I/F 215 connects a reading unit 216 and the control unit 210. The reading unit 216 reads an image on a document, and converts the image into image data such as binary data. The image data generated by the reading unit 216 is transmitted to an external apparatus, is stored in an external recording device, or is printed on a recording sheet.

A printing unit I/F 219 connects a printing unit 220 and the control unit 210. The CPU 211 transfers image data to be printed (image data as print object) to the printing unit 220 via the printing unit I/F 219. The printing unit 220 prints an image on a sheet fed from a feeding cassette (not illustrated).

An external storage I/F 221 connects an external storage device 222 and the control unit 210. The CPU 211 stores the image data in the external storage device 222 via the external storage I/F 221. In the present exemplary embodiment, a universal serial bus (USB) interface is assumed as the external storage I/F 221, and a USB memory is assumed as the external storage device 222, but any storage device, such as a secure digital (SD) card, can be used as the external storage device.

A conversion unit 224 decodes and converts a QR Code® into information such as character information when the image read by the reading unit 216 is converted into image data such as binary data. In a case where it is determined that a character signal including a QR Code® has been received as reception data, the conversion unit 224 converts the character information into a QR Code®. In the present exemplary embodiment, code information to be encoded and decoded by the conversion unit is a QR Code® as a two-dimensional code, but the code information can be one-dimensional code such as a barcode.

A determination unit 225 determines whether the character signal including a QR Code® has been received as the reception data.

The control unit 210 is connected to the public line 100 by a communication unit 223 including a modem.

The communication unit 223 performs the fax communication via the public line 100 to transmit image data and the like to an external apparatus.

The image forming apparatus 102 has a configuration similar to the configuration of the image forming apparatus 101 illustrated in FIG. 2. Thus, a detailed description of the configuration of the image forming apparatus 102 is omitted.

Figure 3:
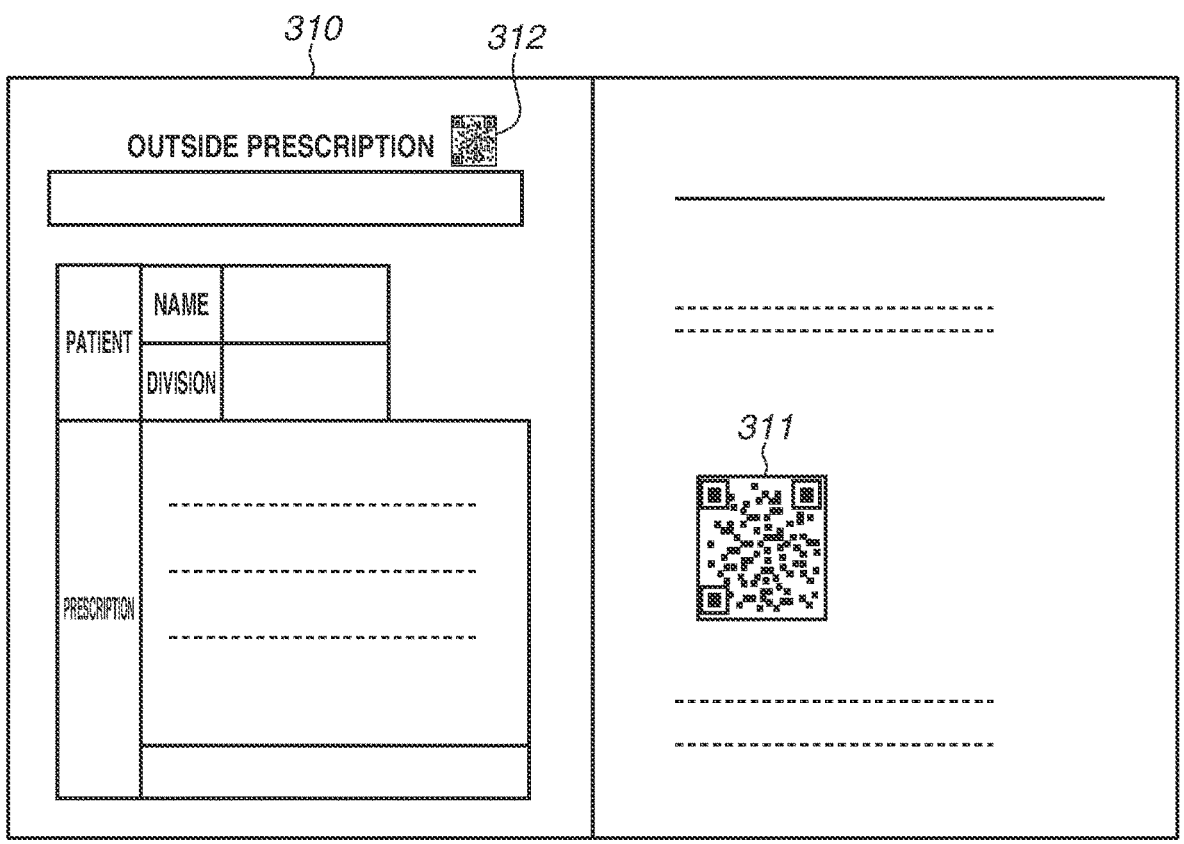
FIG. 3 is a diagram illustrating an example of a document to be read by the image forming apparatus.

FIG. 3 is a diagram illustrating an example of a document to be read by the image forming apparatus 101. A document 310 includes QR Codes® 311 and 312. Information included in each of the QR Codes® 311 and 312 can be in any form, and includes information such as a character string, numbers, alphanumeric characters, and binary data. Examples of contents of the information included in each of the QR Codes® include a uniform resource locator (URL) and data by keys and values.

Figure 4:
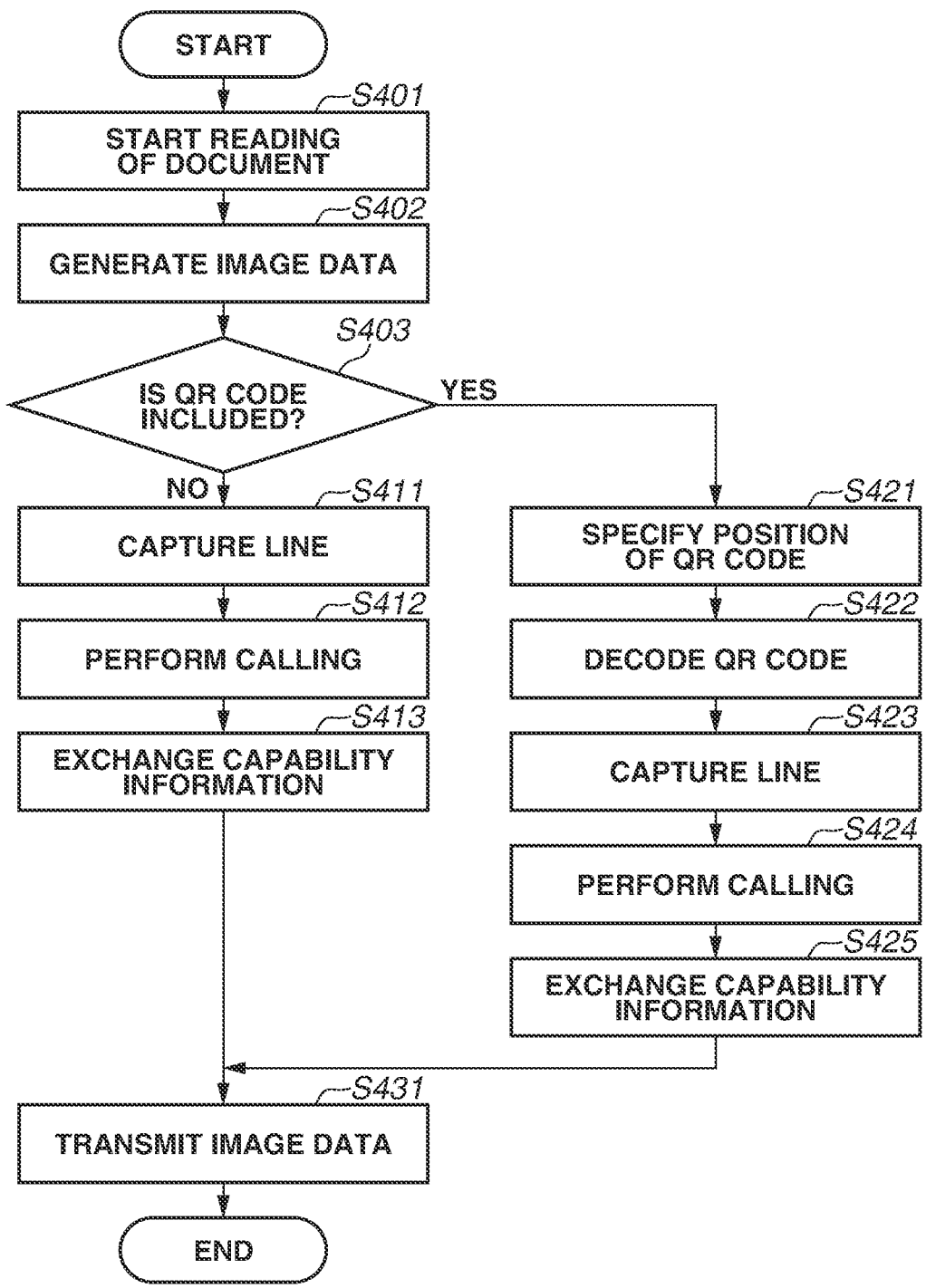
FIG. 4 is a flowchart illustrating a series of processes in which the image forming apparatus faxes image data to another image forming apparatus.

FIG. 4 is a flowchart illustrating a series of processes in which the image forming apparatus 101 faxes image data to the image forming apparatus 102. The series of processes in FIG. 4 is started when fax transmission is instructed by the image forming apparatus 101. The communication unit 223 can include a network I/F for connection to a local area network (LAN).

In step S401, the CPU 211 of the image forming apparatus 101 controls the reading unit 216 to read an image on a document.

In step S402, the CPU 211 of the image forming apparatus 101 generates image data based on data acquired by reading the image on the document by the reading unit 216.

In step S403, the CPU 211 of the image forming apparatus 101 controls the determination unit 225 to determine whether the generated image data includes a QR co d e®, based on the generated image data. In a case where the determination unit 225 determines that the image data includes a QR Code® (YES in step S403), the processing proceeds to step S421. In a case where the determination unit 225 determines that the image data does not include a QR Code® (NO in step S403), the processing proceeds to step S411.

In step S411, the CPU 211 of the image forming apparatus 101 captures a line to call the image forming apparatus 102 set as a transmission destination of the image data via the public line 100.

In step S412, the CPU 211 of the image forming apparatus 101 calls the image forming apparatus 102 using the line captured in step S411.

In step S413, the CPU 211 of the image forming apparatus 101 exchanges capability information with the image forming apparatus 102 that responded in step S412. The capability information includes information on a sheet size, a modem type, a coding system, a recording resolution, and the like. The capability information is exchanged with the image forming apparatus 102, and fax transmission parameters are set based on lower capability. For example, in a case where a reception resolution of the image forming apparatus 102 is lower than a transmission resolution of the image forming apparatus 101, the transmission resolution at the time of fax transmission is adjusted to the reception resolution of the image forming apparatus 102.

In step S421, the CPU 211 of the image forming apparatus 101 specifies a position of the QR Code® included in the image data, and transmits information on the position of the QR Code® to the conversion unit 224. At this time, coordinate information on optional two apexes of the QR Code® as the information on the position of the QR Code® can be transmitted to a reception side via the fax communication.

In step S422, the CPU 211 of the image forming apparatus 101 controls the conversion unit 224 to decode the QR Code®, thereby acquiring information. The acquired information is character information, numerical values, binary data, or the like.

In step S423, the CPU 211 of the image forming apparatus 101 captures a line to call the image forming apparatus 102 set as the transmission destination of the image data via the public line 100.

In step S424, the CPU 211 of the image forming apparatus 101 calls the image forming apparatus 102 using the line captured in step S423.

In step S425, the CPU 211 of the image forming apparatus 101 exchanges capability information with the image forming apparatus 102 that has responded in step S424. The capability information includes information on a sheet size, a modem type, a coding system, a recording resolution, and the like. The capability information is exchanged with the image forming apparatus 102, and the fax transmission parameters are set based on lower capability. For example, in the case where the reception resolution of the image forming apparatus 102 is lower than the transmission resolution of the image forming apparatus 101, the transmission resolution at the time of fax transmission is adjusted to the reception resolution of the image forming apparatus 102. In the communication for exchanging the capability information, the information acquired in step S422 is transmitted to the image forming apparatus 102. This processing is described below with reference to FIG. 8.

In step S431, the CPU 211 of the image forming apparatus 102 faxes the generated image data via the public line 100. In the case where it is determined that the image data includes a QR Code® in step S403, image data can be generated by extracting the QR Code® in the image data after the QR Code® is decoded in step S422. In this case, the image data to be transmitted in the processing in step S413 is the image data on the extracted QR Code®.

Figure 5:
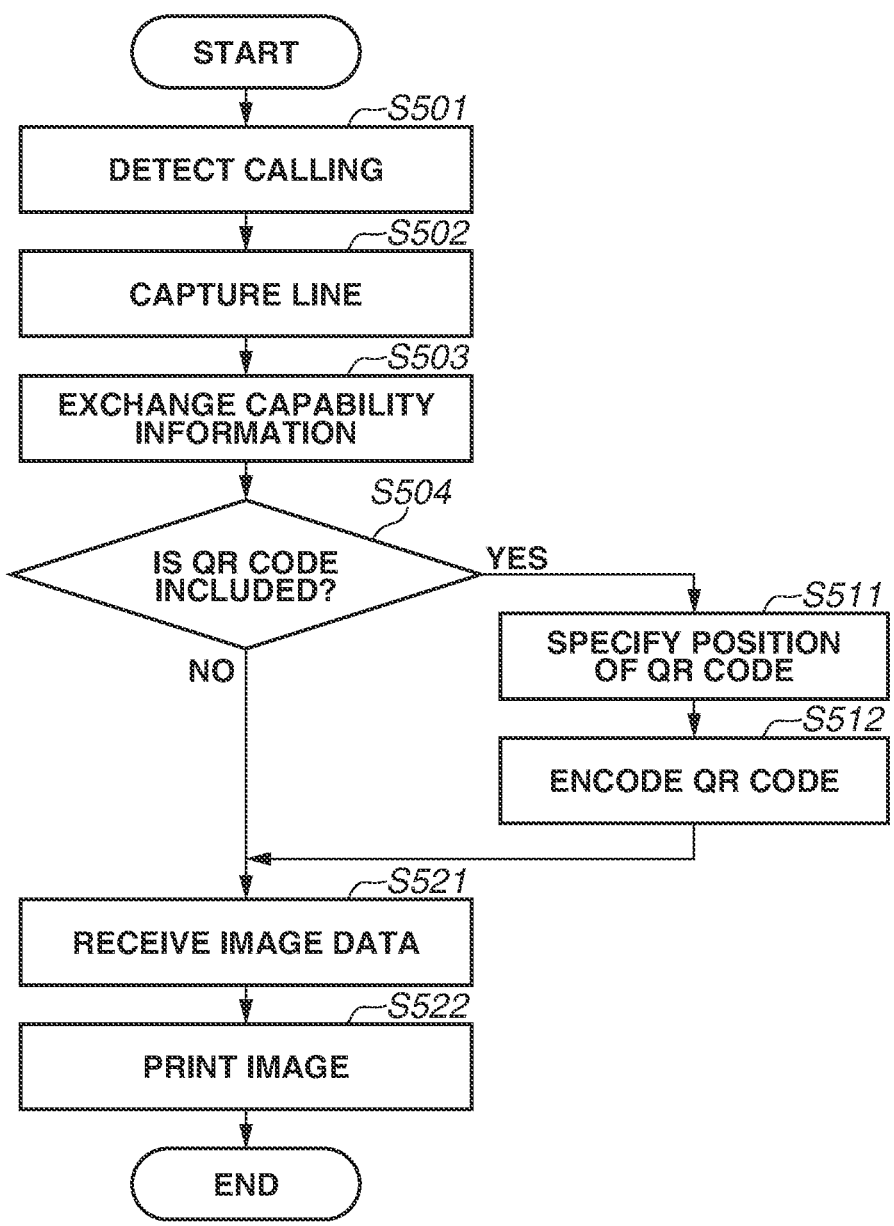
FIG. 5 is a series of processes illustrating an example of print processing based on image data received through fax communication.

FIG. 5 is a flowchart illustrating an example of print processing based on the image data received via the fax communication. The series of processes in FIG. 5 is started when the image forming apparatus 102 is called from the image forming apparatus 101 via the public line 100.

In step S501, a CPU of the image forming apparatus 102 detects calling in step S412 or S424, and starts to respond to the calling.

In step S502, the CPU of the image forming apparatus 102 captures a line. In step S503, the image forming apparatus 102 exchanges the capability information with the image forming apparatus 101.

In step S504, the CPU of the image forming apparatus 102 determines whether QR Code® information has been received in exchange of the capability information in step S503. In a case where it is determined that QR Code® information has been received (YES in step S504), the processing proceeds to step S511. If the QR Code® information has not been received (NO in step S504), the processing proceeds to step S521.

In step S511, the CPU of the image forming apparatus 102 specifies the position of the QR Code® from the QR Code® information acquired in step S504. The position to be specified can be a position based on the information on the position transmitted in step S421, or a position designated by the user of the image forming apparatus 102 via an operation unit of the image forming apparatus 102.

In step S512, the CPU of the image forming apparatus 102 controls a conversion unit to encode information included in the QR Code® information, thereby generating a QR Code®. The information included in the QR Code® information is the information acquired by decoding the QR Code® in step S422, and is character information, a URL, or the like.

In step S521, the CPU of the image forming apparatus 102 receives the image data from the image forming apparatus 101 via the public line 100. In a case where the QR Code® is encoded in step S512, the QR Code® is added to the image data received in step S521 to generate the image data.

In step S522, the image forming apparatus 102 prints an image on a sheet based on the image data received in step S521 or the image data to which the QR Code® encoded in step S512 is added.

Figure 6:
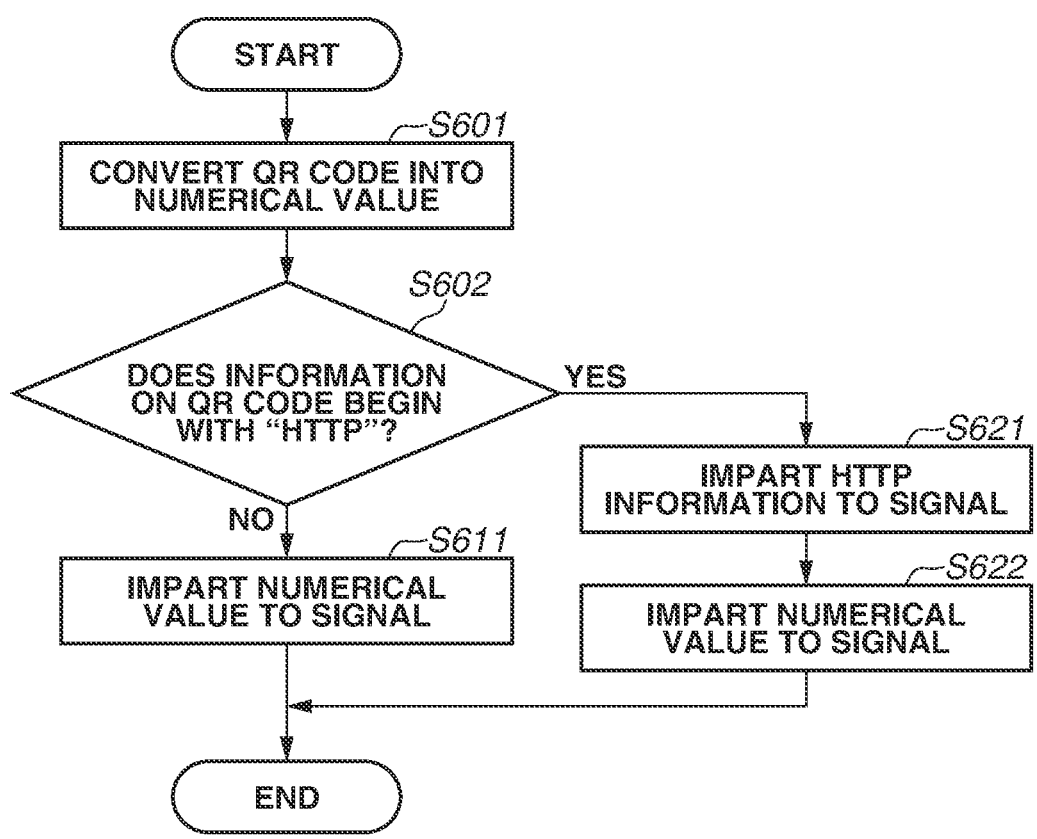
FIG. 6 is a flowchart illustrating an example of QR Code® decoding processing.

FIG. 6 is a flowchart illustrating an example of QR Code® decoding processing. More specifically, the process of FIG. 6 describes the processing in step S422.

In step S601, the CPU 211 of the image forming apparatus 101 controls the conversion unit 224 to decode the QR Code®, thereby acquiring numerical value information.

In step S602, the CPU 211 of the image forming apparatus 101 determines whether the acquired information begins with "http". In a case where it is determined that the information included in the QR Code® begins with "http" (YES in step S602), the processing proceeds to step S621. In a case where the information in the QR Code® does not begin with "http" (NO in step S602), the processing proceeds to step S611.

In step S611, the CPU 211 of the image forming apparatus 101 imparts the numerical value information converted in step S601 to a signal to be transmitted in exchange of the capability information.

In step S621, the CPU 211 of the image forming apparatus 101 imparts information indicating that the information included in the QR Code® begins with "http" to the signal to be transmitted in exchange of the capability information.

In step S622, the CPU 211 of the image forming apparatus 101 imparts the numerical value information converted in step S601 to the signal to be transmitted in exchange of the capability information.

Figure 7:
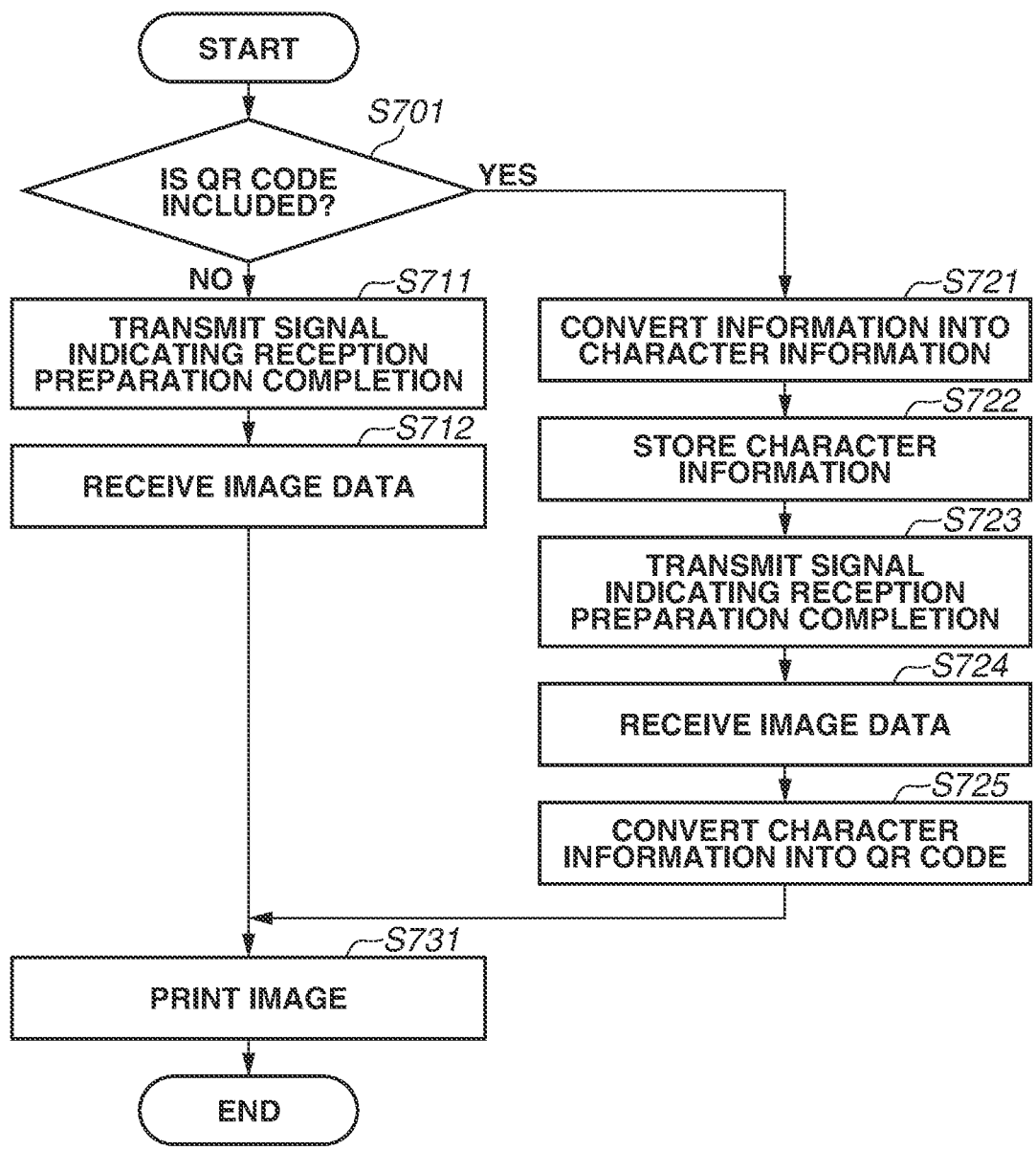
FIG. 7 is a flowchart illustrating an example of QR Code® encoding processing.

FIG. 7 is a flowchart illustrating an example of QR Code® encoding processing. More specifically, the process of FIG. 7 describes the processing in step S512.

The processing in step S701 is the same as the processing in step S403. In a case where the image forming apparatus 102 has not received information on a QR Code® via the fax communication (NO in step S701), the processing proceeds to step S711. In a case where the image forming apparatus 102 has received information on a QR Code® (YES in step S701), the processing proceeds to step S721.

In step S711, the CPU of the image forming apparatus 102 controls a communication unit to transmit a signal indicating that reception preparation has been completed to the image forming apparatus 101.

In step S712, the CPU of the image forming apparatus 102 controls the communication unit to receive the image data from the image forming apparatus 101. The received image data is stored in a storage.

In step S721, the CPU of the image forming apparatus 102 controls the conversion unit to convert the information included in the QR Code® information into character information.

In step S722, the CPU of the image forming apparatus 102 stores the character information converted in step S721 in a storage.

In step S723, the CPU of the image forming apparatus 102 controls the communication unit of the image forming apparatus 102 to transmit the signal indicating that the reception preparation has been completed to the image forming apparatus 101.

In step S724, the CPU of the image forming apparatus 102 receives the image data from the image forming apparatus 101. The received image data is stored in the storage of the image forming apparatus 102.

In step S725, the CPU of the image forming apparatus 102 reads out the character information stored in the storage of the image forming apparatus 102, and generates a QR Code® using the conversion unit of the image forming apparatus 102. The generated QR Code® is added to the image data stored in the storage.

Figure 8:
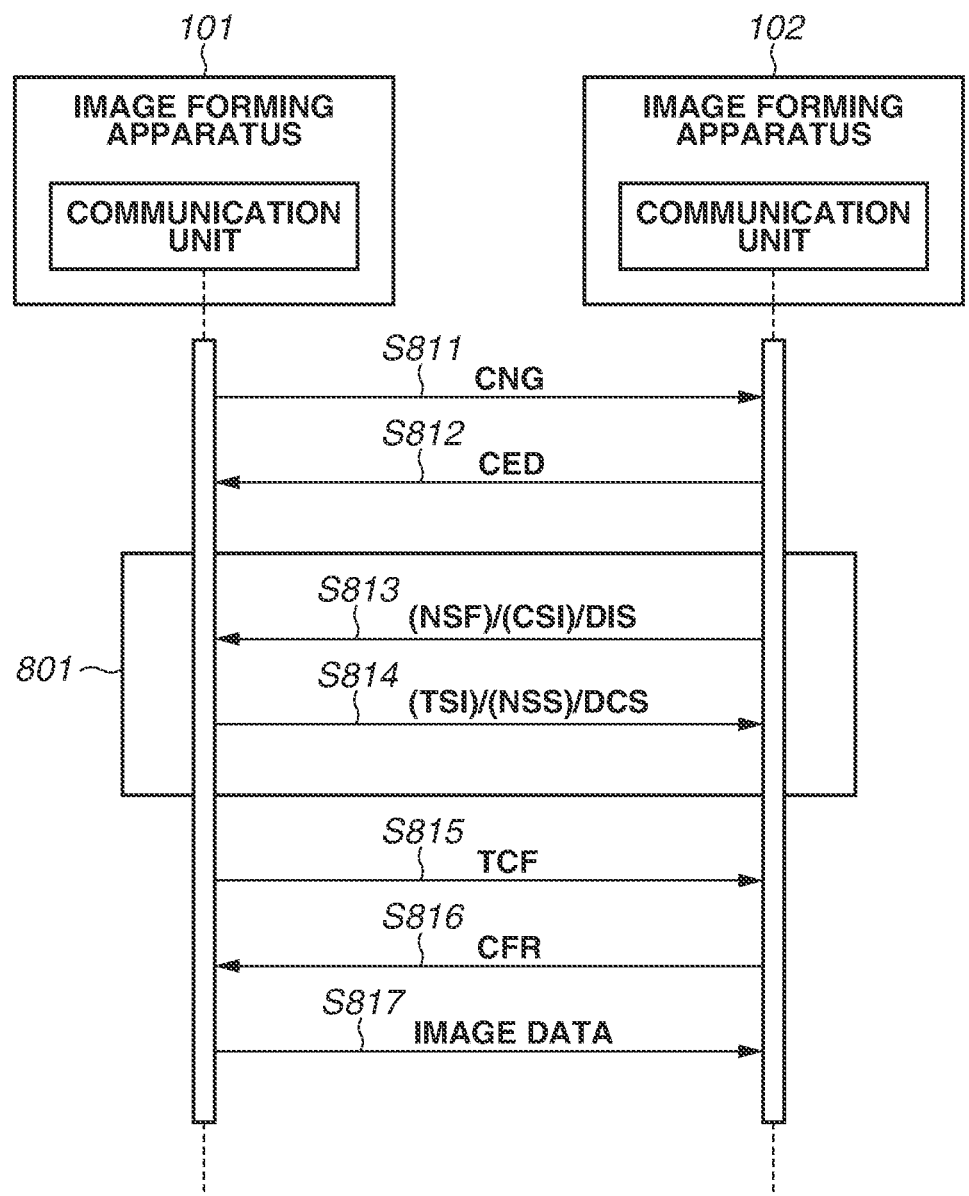
FIG. 8 is a sequence diagram illustrating signal response exchange between the image forming apparatus and the other image forming apparatus.

FIG. 8 is a sequence diagram illustrating signal response exchange between the image forming apparatus 101 and the image forming apparatus 102.

In step S811, the image forming apparatus 101 transmits a CNG signal for identification of fax to the image forming apparatus 102.

In step S812, the image forming apparatus 102 transmits a CED signal indicating a receivable state to the image forming apparatus 101.

In step S813, the image forming apparatus 102 transmits the capability information to the image forming apparatus 101. More specifically, the image forming apparatus 102 transmits a CSI signal indicating an identification number of the image forming apparatus 102, a DIS signal as a digital identification signal, and an NSF signal as a non-standard facilities signal.

In step S814, the image forming apparatus 101 transmits a DCS signal indicating setting transmitted to the image forming apparatus 102 based on the signals received in step S813. The image forming apparatus 101 also transmits a TSI signal indicating an identification number of the image forming apparatus 101 and an NSS signal indicating non-standard function setting. The image forming apparatus 101 transmits the NSS signal including the information acquired by decoding the QR Code®. The NSS signal includes an identification number for determining whether the information acquired by decoding the QR Code® is included. The image forming apparatus 102 on the reception side determines whether the received NSS signal includes the above-described identification number. In a case where it is determined that the identification number is included, the image forming apparatus 102 interprets the information acquired by decoding the QR Code® and included in the NSS signal.

In step S815, the image forming apparatus 101 adjusts a reception state of the modem in the image forming apparatus 102. In step S816, the image forming apparatus 102 issues an instruction about a reception state of the modem in the image forming apparatus 101. In step S817, the image forming apparatus 101 transmits the image data to the image forming apparatus 102.

As described above, the information acquired by decoding the QR Code® is transmitted by being included in the capability information, which makes it possible to transmit the information to the partner fax apparatus while preventing lack of the information. The information acquired by decoding the QR Code® may not be included in the signal of the capability information as long as the information is transmitted by a transmission method independent of the transmission resolution.

FIG. 9 is a diagram illustrating examples of a printing position of a QR Code® printed when the image forming apparatus receives the image data including the QR Code® information.

An example 901 is an example of a case where the printing position of the QR Code® is designated. A QR Code® 911 indicates the printing position in a case where the image forming apparatus 101 designates the printing position of the QR Code® to the position the same as the position in the transmitted document.

An example 902 is an example of a case where the image forming apparatus 101 does not designate the printing position of the QR Code®. In the case where the image forming apparatus 101 does not designate the printing position of the QR Code®, a QR Code® 912 is printed in a header portion.

Figures 10A, 10B:
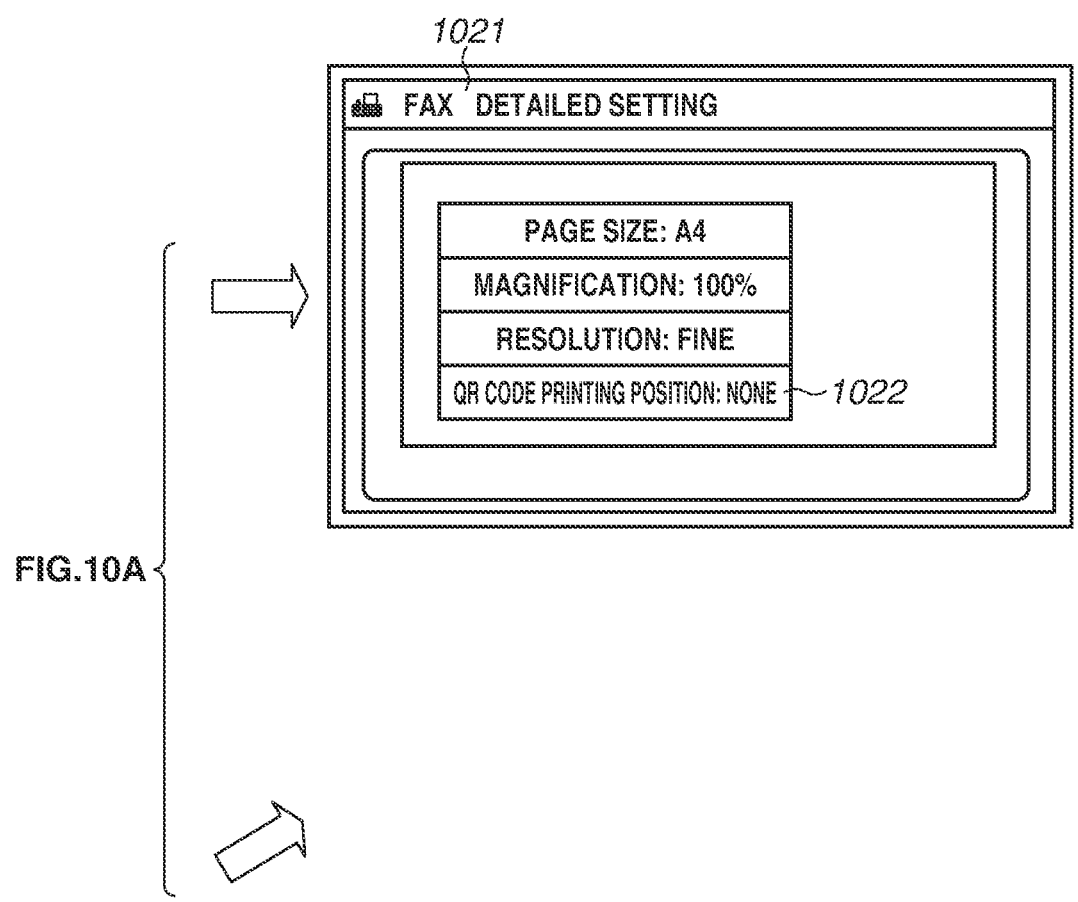
FIGS. 10A and 10B are diagrams illustrating examples of a screen displayed on an operation unit of each of the image forming apparatuses.

FIGS. 10A and 10B are diagrams illustrating examples of a screen displayed on the operation unit of both the image forming apparatuses 101 and 102. A home screen 1001 is a screen for instructing execution of each of functions of the image forming apparatuses 101 and 102, and is displayed on a touch panel screen included in the operation unit 218. Touch images of the respective functions executed by the image forming apparatuses 101 and 102, such as often-used setting, fax, a menu, and an address book are displayed on the home screen 1001. When a touch image for a fax function 1002 is pressed, the screen transits to a fax setting screen 1011.

Currently set values of read setting at transmission, a read size, and the like are displayed in the fax setting screen 1011. When a reading start button 1013 is pressed, reading based on the setting is started. A setting change button 1012 is pressed to change detailed setting included in the read setting.

A detailed setting screen 1021 is displayed when the setting change button 1012 in the fax setting screen 1011 is pressed. Set values of the read setting at transmission, the read size, and the like can be changed in the detailed setting screen 1021. A printing position 1022 of the QR Code® on the reception side when the QR Code® is read can be set. When the image forming apparatus 101 or 102 reads the document in step S421, the image forming apparatus 101 or 102 can specify the position of the QR Code®, and instruct the position of the QR Code® to the conversion unit 224 based on the setting.

A transmission confirmation screen 1031 is displayed when the reading start button 1013 is pressed and the QR Code® is included. When a transmission start button 1033 is pressed, transmission to the image forming apparatus on the reception side is started. When a setting change button 1032 is pressed, the screen transits to the detailed setting screen 1021.

The above-described configuration enables transmission of a QR Code® without considering a state of a reception side when fax transmission is performed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2022-134630, filed Aug. 26, 2022, which is hereby incorporated by reference herein in its entirety.

What is claimed is:

1. A transmission system comprising:
a first fax apparatus; and
a second fax apparatus,
wherein the first fax apparatus includes a first communicator that performs fax communication, and a first controller that acquires information by decoding code information included in image data, wherein the first communicator transmits the image data and the acquired information via the fax communication, and wherein the second fax apparatus includes a second communicator that performs the fax communication, a second controller that generates code information by encoding the information received by the second communicator via the fax communication, and adds the generated code information to the image data received by the second communicator, and a printer that prints an image on a sheet based on image data obtained by the second controller adding the generated code information to the image data received by the second communicator, wherein, in a case where the second communicator receives the image data, the acquired information and position information from the first fax apparatus, the second controller adds the generated code information to a position indicated by the position information received by the second communicator, the position being a position on an image of the image data, and wherein, in a case where the second communicator receives the image data and the acquired information without the position information from the first fax apparatus, the second controller adds the generated code information to a header on the image of the image data.

2. The transmission system according to claim 1, wherein the first communicator transmits the acquired information without depending on a transmission resolution of the fax communication.

3. The transmission system according to claim 1,
wherein the first fax apparatus further includes a scanner, and
wherein the first controller acquires the information by decoding code information included in image data generated by the scanner scanning an image of a document.

4. The transmission system according to claim 1, wherein the generated code information is information in a quick response (QR) code®.

5. The transmission system according to claim 1, wherein the first communicator transmits the image data at a transmission resolution of the second fax apparatus or a transmission resolution of the first fax apparatus, whichever is at a lower resolution.

6. The transmission system according to claim 1, wherein the position indicated by the position information is a position designated by a user.

* * * * *